(12) United States Patent
Dutta

(10) Patent No.: US 10,380,115 B2
(45) Date of Patent: Aug. 13, 2019

(54) CROSS COLUMN SEARCHING A RELATIONAL DATABASE TABLE

(71) Applicant: International Business Machines Corporation, Armonk, NY (US)

(72) Inventor: Binayak Dutta, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 541 days.

(21) Appl. No.: 14/590,182

(22) Filed: Jan. 6, 2015

(65) Prior Publication Data

US 2016/0196310 A1    Jul. 7, 2016

(51) Int. Cl.
| | | |
|---|---|---|
| *G06F 17/30* | (2006.01) | |
| *G06F 7/00* | (2006.01) | |
| *G06F 16/2455* | (2019.01) | |

(52) U.S. Cl.
CPC .............. *G06F 16/24553* (2019.01)

(58) Field of Classification Search
CPC ............. G06F 17/30483; G06F 16/24553
USPC ........................................ 707/769
See application file for complete search history.

(56) References Cited

U.S. PATENT DOCUMENTS

| | | | |
|---|---|---|---|
| 6,434,558 B1 | 8/2002 | MacLeod et al. | |
| 7,248,168 B2 | 7/2007 | Muehl et al. | |
| 7,421,443 B2 | 9/2008 | Rajan et al. | |
| 7,587,383 B2 | 9/2009 | Koo et al. | |
| 7,587,413 B2 | 9/2009 | Nagral et al. | |
| 8,176,074 B2 | 5/2012 | Kreibe | |
| 2002/0099687 A1* | 7/2002 | Krishnaprasad | .. G06F 17/30595 |

(Continued)

FOREIGN PATENT DOCUMENTS

| | | |
|---|---|---|
| CN | 101091213 A | 12/2007 |
| CN | 103902701 A | 7/2014 |

(Continued)

OTHER PUBLICATIONS

"Alter Table—SQL Command", retrieved from the Internet on Sep. 4, 2014, <URL: http://msdn.microsoft.com/en-us/library/ms710978(v=vs.85).aspx>, all pages.

(Continued)

*Primary Examiner* — Kuen S Lu
(74) *Attorney, Agent, or Firm* — Law Offices of Ira D. Blecker, P.C.

(57) ABSTRACT

A method of searching a relational database table which includes: providing a relational database table having a plurality of rows and columns such that each of the plurality of columns has a column name descriptive of data in the each of the columns; providing a relational database management system (RDBMS) to manage access to the relational database table; providing at least one metadata tag to some of the plurality of columns wherein the metadata tag is a non-hierarchical keyword or term that is assigned to the some of the plurality of columns; responsive to selecting at least one metadata tag and responsive to selecting a search string, searching by a search and join function of the RDBMS columns of the some of the plurality of columns corresponding to the at least one metadata tag in the relational database table to find data matching the search string.

20 Claims, 3 Drawing Sheets

(56) References Cited

U.S. PATENT DOCUMENTS

| | | | | |
|---|---|---|---|---|
| 2011/0320433 A1* | 12/2011 | Mohiuddin | ....... | G06F 17/30451 707/714 |
| 2014/0214827 A1 | 7/2014 | Buco et al. | | |
| 2015/0026145 A1* | 1/2015 | Prakash | ............ | G06F 17/30401 707/706 |
| 2016/0092554 A1* | 3/2016 | Srinivasan | ........ | G06F 17/30554 707/798 |
| 2016/0103863 A1* | 4/2016 | Becker | .............. | G06F 17/30241 707/741 |

FOREIGN PATENT DOCUMENTS

| | | |
|---|---|---|
| CN | 104063487 A | 9/2014 |
| TM | 2006073275 A | 7/2006 |

OTHER PUBLICATIONS

"Best way to store tags in a sql server table?—Stack Overflow", retrieved from the Internet on Sep. 4, 2014, <URL: http://stackoverflow.com/questions/145185/best-way-to-store-tags-in-a-sql-server-table>, all pages.

"Efficient approach for language tags (small tag set) in rdbms queries", retrieved from the Internet on Sep. 4, 2014, <URL: http://stackoverflow.com/questions/14106779/efficient-approach-for-language-tags-small-tag-set-in-rdbms-queries>, all pages.

Majid Khan et al., "Exploring Query Optimization Techniques in Relational Databases", International Journal of Database Theory and Application, vol. 6, No. 3, Jun. 2013, pp. 11-20.

"How to find a value in all the columns of table?", retrieved from the Internet on Sep. 4, 2014, <URL: http://social.msdn.microsoft.com/Forums/sqlserver/en-US/d5b82272-22de-475f-a968-3c4lfe884740/how-to-find-a-value-in-all-the-columns-of-table>, all pages.

"Method to Leverage Aggregated Tags for Searching", The IP.com Prior Art Database, Publication Date: Aug. 16, 2010, <URL: http://ip.com/IPCOM/000198791>, all pages.

"Oracle Search all tables all columns for string", retrieved from the Internet on Sep. 4, 2014, <URL: http://stackoverflow.com/questions/6389666/oracle-search-all-tables-all-columns-for-string>, all pages.

"Search all columns of a table for a value?", retrieved from the Internet on Sep. 4, 2014, <URL: http://stackoverflow.com/questions/6539873/search-all-columns-of-a-table-for-a-value>, all pages.

"SQL: Search for a keyword in several columns of a table", retrieved from the Internet on Sep. 4, 2014, <URL: http://codereview.stackexchange.com/questions/2364/sql-search-for-a-keyword-in-severalcolumns-of-a-table>, all pages.

"What is the most efficient way to store tags in a database?", retrieved from the Internet on Sep. 4, 2014, <URL: http://stackoverflow.com/questions/334183/what-is-the-most-efficient-way-to-store-tags-in-a-database>, all pages.

* cited by examiner

TABLE 1 (CUSTOMER_FEEDBACK)

| RECORD NO. | CUSTOMER | DESCRIPTION | COMMENTS |
|---|---|---|---|
| 1 | A | GOOD | EXCELLENT |
| 2 | B | EXCELLENT | EXCELLENT |
| 3 | C | GOOD | GOOD |

FIG. 1
Prior Art

| RECORD NO. | QUERY 1 | QUERY 2 |
|---|---|---|
| 1 | DESCRIPTION | COMMENTS |
| 2 | DESCRIPTION | COMMENTS |
| 3 | DESCRIPTION | COMMENTS |

QUERY 1 SELECT *FROM TAB1 WHERE COLUMN 3 LIKE "% EXCELLENT %"

UNION

QUERY 2 SELECT *FROM TAB1 WHERE COLUMN 4 LIKE "% EXCELLENT %"

FIG. 2 Prior Art

| | TABLE 1 (CUSTOMER_FEEDBACK) | | | |
|---|---|---|---|---|
| | RECORD | NAME | DESCRIPTION, SENTIMENT | COMMENTS, SENTIMENT |
| | RECORD NO. | CUSTOMER | DESCRIPTION | COMMENTS |
| | 1 | A | GOOD | EXCELLENT |
| | 2 | B | EXCELLENT | EXCELLENT |
| | 3 | C | GOOD | GOOD |

FIG. 3

| RECORD NO. | QUERY | |
|---|---|---|
| 1 | DESCRIPTION | COMMENTS |
| 2 | DESCRIPTION | COMMENTS |
| 3 | DESCRIPTION | COMMENTS |

QUERY SELECT *FROM TAB1 WHERE TAG SENTIMENT LIKE "% EXCELLENT %"

FIG. 4

CROSS COLUMN SEARCHING A RELATIONAL DATABASE TABLE

BACKGROUND

The present exemplary embodiments relate to searching in relational database management systems and, more particularly, relate to a method of searching in relational database management systems in which multiple columns may be searched at the same time.

A relational database is a collection of related data that is organized in related two dimensional tables of columns and rows wherein information may be derived by performing set operations on the tables, such as join, sort, merge, and so on.

More specifically, each database is a collection of related tables. Each table is a physical representation of an entity or object that is in a tabular format consisting of columns and rows. Columns are the fields of a record or the attributes of an entity. The rows contain the values or data instances; these are also called records or tuples.

Relationships exist both among the columns within a table and among the tables. These relationships take three logical forms: one-to-one, one-to-many, or many-to-many. Most relational databases are designed so there is only one value per cell (an intersection of a column and row); in this design pattern, there are only one-to-one relationships within a table. Each table is named according to the data it contains, such as people or addresses.

Between the actual database and the users of the system is a software layer known as the relational database management system (RDBMS). The RDBMS is responsible for handling all requests for access to the database, shielding the users from the details of any specific hardware implementation. The RDBMS is a control system that supports database features including, but not limited to, storing data, retrieving data and updating data.

The data stored in a relational database is typically accessed by way of a user-defined query that is constructed in a query language such as Structured Query Language (SQL). An SQL query is non-procedural in that it specifies the objective or desired result of the query in a language meaningful to a user but does not define the steps to be performed, or the order of the steps in order to accomplish the query.

BRIEF SUMMARY

The various advantages and purposes of the exemplary embodiments as described above and hereafter are achieved by providing, according to a first aspect of the exemplary embodiments, a method of searching a relational database table including: providing a relational database table having a plurality of rows and columns such that each of the plurality of columns has a column name descriptive of data in the each of the columns; providing a relational database management system (RDBMS) to manage access to the relational database table; providing at least one metadata tag to at least some of the plurality of columns wherein the metadata tag is a non-hierarchical keyword or term that is assigned to the at least some of the plurality of columns; responsive to selecting at least one metadata tag and responsive to selecting a search string, searching by a search and join function of the RDBMS columns of the at least some of the plurality of columns corresponding to the at least one metadata tag in the relational database table to find data matching the search string in the at least some of the plurality of columns corresponding to the at least one metadata tag. The method is implemented on at least one computing device.

According to a second aspect of the exemplary embodiment, there is provided a method of searching a relational database table including: providing a relational database table having a plurality of rows and columns such that each of the plurality of columns has a column name descriptive of data in the each of the columns; providing a relational database management system (RDBMS) to manage access to the relational database table; detecting when at least one metadata tag has been provided to at least some of the plurality of columns wherein the metadata tag is a non-hierarchical keyword or term that is assigned to the at least some of the plurality of columns; when at least one metadata tag has been provided to at least some of the plurality of columns, fetching a list of metadata tags corresponding to the at least some of the plurality of columns; responsive to selecting at least one metadata tag and responsive to selecting a search string, searching by a search and join function of the RDBMS columns of the at least some of the plurality of columns corresponding to the at least one metadata tag in the relational database table to find data matching the search string in the at least some of the plurality of columns corresponding to the at least one metadata tag. The method is implemented on at least one computing device.

According to a third aspect of the exemplary embodiments, there is provided a computer program product for searching a relational database table. The computer program product including a computer readable storage medium having computer readable program code embodied therewith. The computer readable program code including: computer readable program code configured to provide a relational database table having a plurality of rows and columns such that each of the plurality of columns has a column name descriptive of data in the each of the columns; computer readable program code configured to provide a relational database management system (RDBMS) to manage access to the relational database table; computer readable program code configured to provide at least one metadata tag to at least some of the plurality of columns wherein the metadata tag is a non-hierarchical keyword or term that is assigned to the at least some of the plurality of columns; responsive to selecting at least one metadata tag and responsive to selecting a search string, computer readable program code configured to search by a search and join function of the RDBMS columns of the at least some of the plurality of columns corresponding to the at least one metadata tag in the relational database table to find data matching the search string.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 1 is a conventional relational database table.

FIG. 2 are conventional column by column queries with respect to Table 1 in FIG. 1.

FIG. 3 is a relational database table having metadata tags for each column.

FIG. 4 is a query using a metadata tag from Table 1 in FIG. 3.

DETAILED DESCRIPTION

Figure 5:
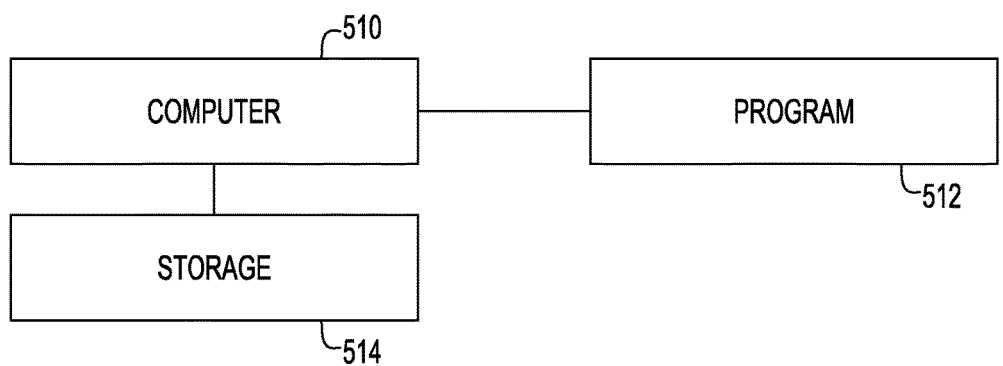
FIG. 5 is a block diagram of a computing device for implementing the exemplary embodiments.

Referring to the Figures in more detail, and particularly referring to FIG. 1, there is shown an example of a conventional relational database table 10, nominally labeled as Table 1 (CUSTOMER_FEEDBACK). The relational database table 10 includes a plurality of rows 12a, 12b, 12c, a plurality of columns 14a, 14b, 14c, 14d and a plurality of column names 16a, 16b, 16c, 16d. In the relational database table of FIG. 1, there is one column name for each column. Thus, column name "RECORD NO." 16a corresponds to column 14a, column name "CUSTOMER" 16b corresponds to column 14b, column name "DESCRIPTION" 16c corresponds to column 14c and column name "COMMENTS" 16d corresponds with column 14d.

Access to the relational database table 10 may be handled by an RDBMS. The RDBMS may include a query processor for accessing the data through an SQL query.

With respect to the relational database table 10 in FIG. 1, a user may wish to locate the record having the same text or text pattern across different columns which may be similar in nature in a relational database table. Assuming there may be some number of customers in the relational database table 10, it may be desirable, for example, to search for those records or customers having the text "excellent" in the column 14c with the column name "DESCRIPTION" and column 14d with the column name "COMMENTS" as either of these columns may contain the text "excellent".

In order to conventionally search two columns of the relational database table 10, two queries will have to be written to search each column separately. Referring now to FIG. 2, there is illustrated the queries necessary to search columns 14c, 14d. Query 1 will search the description in column 14c for the text "excellent". Query 1 may be formulated as follows:

SELECT *from TAB1 where Column 3 like "% excellent %"

Query 2 will search the comments in column 14d for the text "excellent". Query 2 may be formulated as follows:

SELECT *from TAB1 where Column 4 like "% excellent %"

In order to search for both the description and comments columns for the text "excellent", the queries are joined together as shown below and in FIG. 2 as:

QUERY 1 SELECT *from TAB1 where Column 3 like "% excellent %"
UNION
QUERY 2 SELECT *from TAB1 where Column 4 like "% excellent %"

The exact syntax may vary between SQL vendors but this simple search illustrates a problem with the conventional method of searching relational database tables, such as relational database table 10, in that each column searched needs its own search query which are then joined.

Current RDBMSs do not allow an efficient and easy method of searching content across columns of a relational database table. The issue becomes more pronounced when the table has one or more of the following traits:

a. The relational database table is designed to store information across columns. For example, product/service description stored across two or more columns. Effective classification needs analysis of both the columns.

b. The relational database table is designed to store different types of user inputs in different columns. For example, a service ticket record having columns for issue description, diagnostics, resolution, feedback. Efficiency analysis should consider text in all the columns.

Application developers and database administrators may address this problem by creating complex queries to search the columns separately and then join the result sets.

A solution is proposed in which multiple columns of a relational database table may be searched in one search and join operation.

According to the exemplary embodiments, it is proposed to add tags to at least some, and preferably all, of the columns of the relational database table. A tag is a non-hierarchical keyword or term assigned to the column names of the relational database table.

Table 1 in FIG. 1 has been modified to add metadata tags (hereafter just "tag" or "tags") to each of the column names in each of the columns. Referring now to Table 1 (CUSTOMER_FEEDBACK) 20 in FIG. 3, tag 22a RECORD has been added to column name "RECORD NO." 16a in column 14a, tag 22b NAME has been added to column name "CUSTOMER" 16b in column 14b, tags 22c DESCRIPTION, SENTIMENT have been added to column name "DESCRIPTION" 16c in column 14c and tags 22d COMMENTS, SENTIMENT have been added to column name "COMMENTS 16d in column 14d.

It is noted that there may be more than tag for each column, as is the case for columns 22c, 22d. Having more than one tag per column allows for more versatility in searching.

Again, with respect to the relational database table 20 in FIG. 3, a user may wish to locate the records containing the text "excellent". Again assuming there may be some number of customers in the relational database table 20, it may be desirable, for example, to search for those records or customers having the text "excellent" in the column 14c with the column name "DESCRIPTION" and column 14d with the column name "COMMENTS" as either of these columns may contain the text "excellent".

According to the exemplary embodiments, in order to search the two columns of the relational database table 20, only one query may have to be written to do a single search and join operation using the tag "SENTIMENT". Referring now to FIG. 4, there is illustrated the query necessary to search columns 14c, 14d. The query may be formulated as follows:

SELECT *from TAB1 where TAG SENTIMENT like "% excellent %"

Thus, searching on the SENTIMENT tag allows searching both columns with only one search and join operation. The searching need not be confined to just two columns. Any number of columns may be combined for searching using the tag.

According to the exemplary embodiments, table records may be searched based on the column tags such as the column tags 22a-22d shown in FIG. 3. The RDBMS will detect if the query represents a tag-based search. For a tag-based search, the RDBMS will refer to the table metadata to fetch the list of column names represented by the tag or tags. For actual searching, for each relevant record, the RDBMS may search all the columns sequentially (based on column order) until a match is found or the column list is exhausted with no match.

When creating the relational database tables, the following (or similar) syntax may be used to add tags:

```
Create table (<TAB1>) columns
{
(<columnName1>) <existing parameters> [tag:<tagName1>, <tagName2>..]
(<columnName2>) <existing parameters> [tag:<tagName1>, <tagName3>..]
(<columnName3>) <existing parameters> [tag:<tagName2>, <tagName3>..]
....
}
```

When modifying currently existing relational database tables, the following (or similar) syntax may be used to add tags:

```
Alter table (<TAB1>) ADD TAG (<columnName1>)
    tag:<tagName4>,<tagName5>
```

Since TAG is a logical grouping, CONSTRAINTS won't be applicable.

Though the design of actual SQL syntax and the data management algorithm lies with the RDBMS vendors, the above are the generic representations to add tags to relational database tables.

The tags may be implemented in the RDBMS in the following manner.

First, similar to column constraints, the RDBMS needs to provide DDL (data definition language) structure and process to define, store and manage one or more tags at column level. The DDL is located in the database.

Second, the RDBMS needs to extend the search and join functionality to column tags. The search and join operation on tags should cover all the columns which are tagged. For instance, if a query searches a text against a tag, the relational database should internally compare it with all the tagged columns and return all the records where one or more of the tagged columns matches the search string.

Third, the RDBMS needs to extend the index and partition capability to the tag. The index when created over a tag should index all the columns with the tag.

Fourth, tagging may be restricted to searching/filtering only. Tagging may not be extended to CRUD (create, read, update and delete), aggregation or aggregation functions.

The computing devices implementing the exemplary embodiments may be a general-purpose computer or a special purpose device such as a hand-held computer. FIG. 5 is a block diagram that illustrates one exemplary hardware environment of the computing devices. The exemplary embodiments may be implemented using a computer 510 comprised of microprocessor means, random access memory (RAM), read-only memory (ROM) and other components. The computer 510 may be a personal computer, server, mainframe computer, hand-held device or other computing device. Resident in the computer 510, or peripheral to it, may be a storage device 514 of some type.

Generally speaking, the software implementation of the exemplary embodiments, program 512 in FIG. 5, may be tangibly embodied in a computer-readable storage medium such as storage device 514 mentioned above. The program 512 may comprise instructions which, when read and executed by the microprocessor of the computer 510, may cause the computer 510 to perform the steps necessary to execute the steps or elements of the exemplary embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of searching a relational database table comprising:
   providing a relational database that is a collection of related relational database tables such that relationships exist both among columns within each relational database table and among the related relational database tables wherein each relational database table having a plurality of rows and columns such that each of the plurality of columns has a column name descriptive of data in the each of the columns;
   providing a relational database management system (RDBMS) to manage access to the relational database tables;
   providing at least one metadata tag in addition to the column name to at least some of the plurality of columns in the relational database tables such that the at least one metadata tag and the column name exist concurrently in the same column in the same relational database table for the at least some of the plurality of columns in the relational database tables, wherein the metadata tag is a non-hierarchical keyword or term that is assigned to the at least some of the plurality of columns;
   responsive to selecting at least one metadata tag and responsive to selecting a search string, searching by a search and join function of the RDBMS columns of the at least some of the plurality of columns corresponding to the at least one metadata tag in the relational database tables to find data matching the search string in the at least some of the plurality of columns corresponding to the at least one metadata tag;
   the method being implemented on at least one computing device.

2. The method of claim 1 wherein searching the columns is done sequentially until a match is found or until the column list is exhausted.

3. The method of claim 1 wherein providing at least one metadata tag occurs when the relational database tables are created.

4. The method of claim 1 wherein providing at least one metadata tag occurs after the relational database tables are created.

5. The method of claim 1 wherein providing at least one metadata tag in addition to the column name includes providing at least one metadata tag to each column of the plurality of columns such that the at least one metadata tag and the column name exist concurrently in the same column in the same relational database table for each column of the plurality of columns in the relational database tables.

6. The method of claim 1 wherein providing at least one metadata tag includes providing a plurality of metadata tags to at least some of the plurality of columns.

7. The method of claim 1 wherein the searching is for the same search string in each of the at least some of the plurality of columns corresponding to the at least one metadata tag.

8. A method of searching a relational database table comprising:
   providing a relational database that is a collection of related relational database tables such that relationships exist both among columns within each relational database table and among the related relational database tables wherein each relational database table having a plurality of rows and columns such that each of the plurality of columns has a column name descriptive of data in the each of the columns;

providing a relational database management system (RDBMS) to manage access to the relational database tables;

detecting when at least one metadata tag in addition to the column name has been provided to at least some of the plurality of columns in the relational database tables such that the at least one metadata tag and the column name exist concurrently in the same column in the same relational database table for the at least some of the plurality of columns in the relational database tables, wherein the metadata tag is a non-hierarchical keyword or term that is assigned to the at least some of the plurality of columns;

when at least one metadata tag has been provided to at least some of the plurality of columns, fetching a list of metadata tags corresponding to the at least some of the plurality of columns;

responsive to selecting at least one metadata tag and responsive to selecting a search string, searching by a search and join function of the RDBMS columns of the at least some of the plurality of columns corresponding to the at least one metadata tag in the relational database tables to find data matching the search string in the at least some of the plurality of columns corresponding to the at least one metadata tag, the method being implemented on at least one computing device.

9. The method of claim 8 wherein searching the columns is done sequentially until a match is found or until the column list is exhausted.

10. The method of claim 8 wherein providing at least one metadata tag occurs when the relational database tables are created.

11. The method of claim 8 wherein providing at least one metadata tag occurs after the relational database tables are created.

12. The method of claim 8 wherein providing at least one metadata tag in addition to the column name includes providing at least one metadata tag to each column of the plurality of columns such that the at least one metadata tag and the column name exist concurrently in the same column in the same relational database table for each column of the plurality of columns in the relational database tables.

13. The method of claim 8 wherein providing at least one metadata tag includes providing a plurality of metadata tags to at some of the plurality of columns.

14. The method of claim 8 wherein the searching is for the same search string in each of the at least some of the plurality of columns corresponding to the at least one metadata tag.

15. A computer program product for searching a relational database table, the computer program product comprising:
a computer readable storage medium having computer readable program code embodied therewith, the computer readable program code comprising:
computer readable program code configured to provide a relational database that is a collection of related relational database tables such that relationships exist both among columns within each relational database table and among the related relational database tables wherein each relational database table having a plurality of rows and columns such that each of the plurality of columns has a column name descriptive of data in the each of the columns;
computer readable program code configured to provide a relational database management system (RDBMS) to manage access to the relational database tables;
computer readable program code configured to provide at least one metadata tag in addition to the column name to at least some of the plurality of columns in the relational database tables such that the at least one metadata tag and the column name exist concurrently in the same column in the same relational database table for the at least some of the plurality of columns in the relational database tables, wherein the metadata tag is a non-hierarchical keyword or term that is assigned to the at least some of the plurality of columns;
responsive to selecting at least one metadata tag and responsive to selecting a search string, computer readable program code configured to search by a search and join function of the RDBMS columns of the at least some of the plurality of columns corresponding to the at least one metadata tag in the relational database tables to find data matching the search string.

16. The computer program product of claim 15 wherein computer readable program code configured to search the columns is done sequentially until a match is found or until the column list is exhausted.

17. The computer program product of 15 wherein computer readable program code configured to provide at least one metadata tag occurs when the relational database tables are created.

18. The computer program product of claim 15 wherein computer readable program code configured to provide at least one metadata tag occurs after the relational database tables are created.

19. The computer program product of claim 15 wherein computer readable program code configured to provide at least one metadata tag includes computer readable program code configured to provide at least one metadata tag in addition to the column name to each column of the plurality of columns such that the at least one metadata tag and the column name exist concurrently in the same column in the same relational database table for each column of the plurality of columns in the relational database tables.

20. The computer program product of claim 15 wherein computer readable program code configured to provide at least one metadata tag includes computer readable program code configured to provide a plurality of metadata tags to at least some of the plurality of columns.

* * * * *